United States Patent Office.

RENÉ BOHN, OF MANNHEIM, GERMANY, ASSIGNOR TO THE BADISCHE ANILIN AND SODA FABRIK, OF LUDWIGSHAFEN, GERMANY.

NAPHTHAZARIN SULFO-ACID AND PROCESS OF MAKING SAME.

SPECIFICATION forming part of Letters Patent No. 646,795, dated April 3, 1900.

Application filed April 11, 1899. Serial No. 712,630. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a Sulfo-Acid of Naphthazarin, (for which application for patent has been made in Germany, filed September 16, 1898, No. B. 23,418; in England, filed November 23, 1898, No. 24,752, and in France, filed November 28, 1898, No. 271,355,) of which the following is a specification.

In United States Patent No. 631,614, granted August 22, 1899, there is described the production of a leuco compound from the body known in chemical literature as the "naphthazarin" intermediate product. In United States Patent No. 627,896, granted June 27, 1899, the conversion of the said leuco compound into a new blue coloring-matter having the nature of a sulfoacid was described.

My present invention relates to the manufacture of a body which is chemically a sulfo-acid of naphthazarin from the blue sulfonated coloring-matter of the said Patent No. 627,896. The new sulfoacid of naphthazarin is obtained by treating the said coloring-matters with hydrochloric or equivalent mineral acid—such, for instance, as sulfuric acid—in aqueous solution.

The following example will serve to illustrate the nature of the invention and the manner in which it is best carried into practical effect. The parts are by weight: Mix together about ten (10) parts of the aforesaid coloring-matter, about five hundred (500) parts of water, and ten (10) parts of hydrochloric acid, (containing about thirty-two per cent. real H.Cl.) Boil this mixture for about half an hour. Its color is at first blue, but during the operation it turns magenta-red. Add potassium chlorid to the solution so obtained. The sulfoacid of naphthazarin separates out. Filter and dry.

My new sulfoacid of naphthazarin is a brown-red powder which gives a magenta-red solution in water. The solution in caustic soda is blue and in concentrated sulfuric acid violet-red. If unmordanted wool be dyed from the acid-bath with my new sulfoacid of naphthazarin, brown-red shades are obtained. On treating the goods so dyed with a bichromate the color turns deep black. The shades so obtained are characterized by great fastness.

Now what I claim is—

1. The process for the production of a sulfo-acid of naphthazarin which consists in treating a sulfonated leuco compound of the naphthazarin intermediate product with hydrochloric acid, in aqueous solution, all substantially as described.

2. As a new article of manufacture the sulfoacid of naphthazarin which can be obtained from a sulfonated leuco compound of the naphthazarin intermediate product, and which gives a magenta-red solution with water, a blue solution with aqueous caustic soda and a violet-red solution with concentrated sulfuric acid, all substantially as described.

In testimony whereof I have hereunto set my hand in the presence of two subscribing witnesses.

RENÉ BOHN.

Witnesses:
ERNEST F. EHRHARDT,
J. L. HEINKE.